United States Patent
Chaganti et al.

(10) Patent No.: US 11,748,171 B2
(45) Date of Patent: Sep. 5, 2023

(54) METHOD AND SYSTEM FOR COLLABORATIVE WORKLOAD PLACEMENT AND OPTIMIZATION

(71) Applicant: Dell Products L.P., Hopkinton, MA (US)

(72) Inventors: Ravikanth Chaganti, Bangalore (IN); Dharmesh M. Patel, Round Rock, TX (US); Rizwan Ali, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 557 days.

(21) Appl. No.: 16/821,924

(22) Filed: Mar. 17, 2020

(65) Prior Publication Data

US 2021/0294667 A1    Sep. 23, 2021

(51) Int. Cl.
*G06F 9/50* (2006.01)

(52) U.S. Cl.
CPC .......... *G06F 9/5083* (2013.01); *G06F 9/5011* (2013.01)

(58) Field of Classification Search
CPC .............................. G06F 9/5083; G06F 9/5011
See application file for complete search history.

(56) References Cited

U.S. PATENT DOCUMENTS

| | | | | |
|---|---|---|---|---|
| 10,791,168 | B1* | 9/2020 | Dilley | H04L 67/288 |
| 2002/0165964 | A1* | 11/2002 | Chen | H04L 9/40 |
| | | | | 709/226 |
| 2004/0077366 | A1* | 4/2004 | Panasik | H04L 1/0023 |
| | | | | 455/426.2 |
| 2007/0011294 | A1* | 1/2007 | Ohara | H04L 61/4541 |
| | | | | 709/223 |
| 2007/0027835 | A1* | 2/2007 | Enenkiel | G06F 16/958 |
| 2008/0002610 | A1* | 1/2008 | Zheng | H04L 45/00 |
| | | | | 370/328 |
| 2012/0260179 | A1* | 10/2012 | Reshadi | G06F 9/5061 |
| | | | | 715/735 |
| 2012/0284410 | A1* | 11/2012 | Dudek | G06F 9/5027 |
| | | | | 709/226 |
| 2013/0067267 | A1* | 3/2013 | Tamhane | G06F 15/161 |
| | | | | 709/224 |
| 2017/0220329 | A1* | 8/2017 | Yang | G06F 8/63 |
| 2018/0219899 | A1* | 8/2018 | Joy | G06F 11/3433 |

* cited by examiner

*Primary Examiner* — Meng Ai T An
*Assistant Examiner* — Willy W Huaracha
(74) *Attorney, Agent, or Firm* — Chamberlain, Hrdlicka, White, Williams & Aughtry

(57) ABSTRACT

A method and system for collaborative workload placement and optimization. Specifically, the disclosed method and system entail implementing metric exchange between hosts in a clustered or non-clustered environment to perform infrastructure workload placement and optimization decisions. The exchange of metrics may be performed through a lightweight service, which would not impact any existing environment resource utilization. Further, resource utilization maps may be used to offer near real-time tracking of resource utilization across the aforementioned hosts, thereby facilitating resource utilization forecasting for the efficient placement and optimization of workloads throughout the environment.

18 Claims, 10 Drawing Sheets

METHOD AND SYSTEM FOR COLLABORATIVE WORKLOAD PLACEMENT AND OPTIMIZATION

BACKGROUND

In typical enterprise data center environments, multiple server systems and other solution infrastructure components collectively provide the necessary functionality to host workloads in the environments. Currently, however, workload placement and optimization may be controlled by infrastructure managers or consoles monitoring the infrastructure, which tend to be expensive and may incur management overhead.

SUMMARY

In general, in one aspect, the invention relates to a method for collaborative workload placement. The method includes obtaining, by an origin infrastructure node, a first workload request including a first workload configuration for a first workload, identifying, based on the first workload configuration, a first target infrastructure node, wherein the first target infrastructure node is not the origin infrastructure node, multicasting a workload allocation request for the first workload to a plurality of participants operatively connected through a metric exchange network, wherein the plurality of participants includes the first target infrastructure node, and deploying, based on responses to the workload allocation request from the plurality of participants, the first workload to the first target infrastructure node.

In general, in one aspect, the invention relates to a non-transitory computer readable medium (CRM). The non-transitory CRM includes computer readable program code, which when executed by a computer processor, enables the computer processor to obtain, by an origin infrastructure node, a first workload request including a first workload configuration for a first workload, identify, based on the first workload configuration, a first target infrastructure node, wherein the first target infrastructure node is not the origin infrastructure node, multicast a workload allocation request for the first workload to a plurality of participants operatively connected through a metric exchange network, wherein the plurality of participants includes the first target infrastructure node, and deploy, based on responses to the workload allocation request from the plurality of participants, the first workload to the first target infrastructure node.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for collaborative workload placement and optimization. Specifically, one or more embodiments of the invention entails implementing metric exchange between hosts in a clustered or non-clustered environment to perform infrastructure workload placement and optimization decisions. The exchange of metrics may be performed through a lightweight service, which would not impact any existing environment resource utilization. Further, resource utilization maps may be used to offer near real-time tracking of resource utilization across the aforementioned hosts, thereby facilitating resource utilization forecasting for the efficient placement and optimization of workloads throughout the environment.

Figure 1:
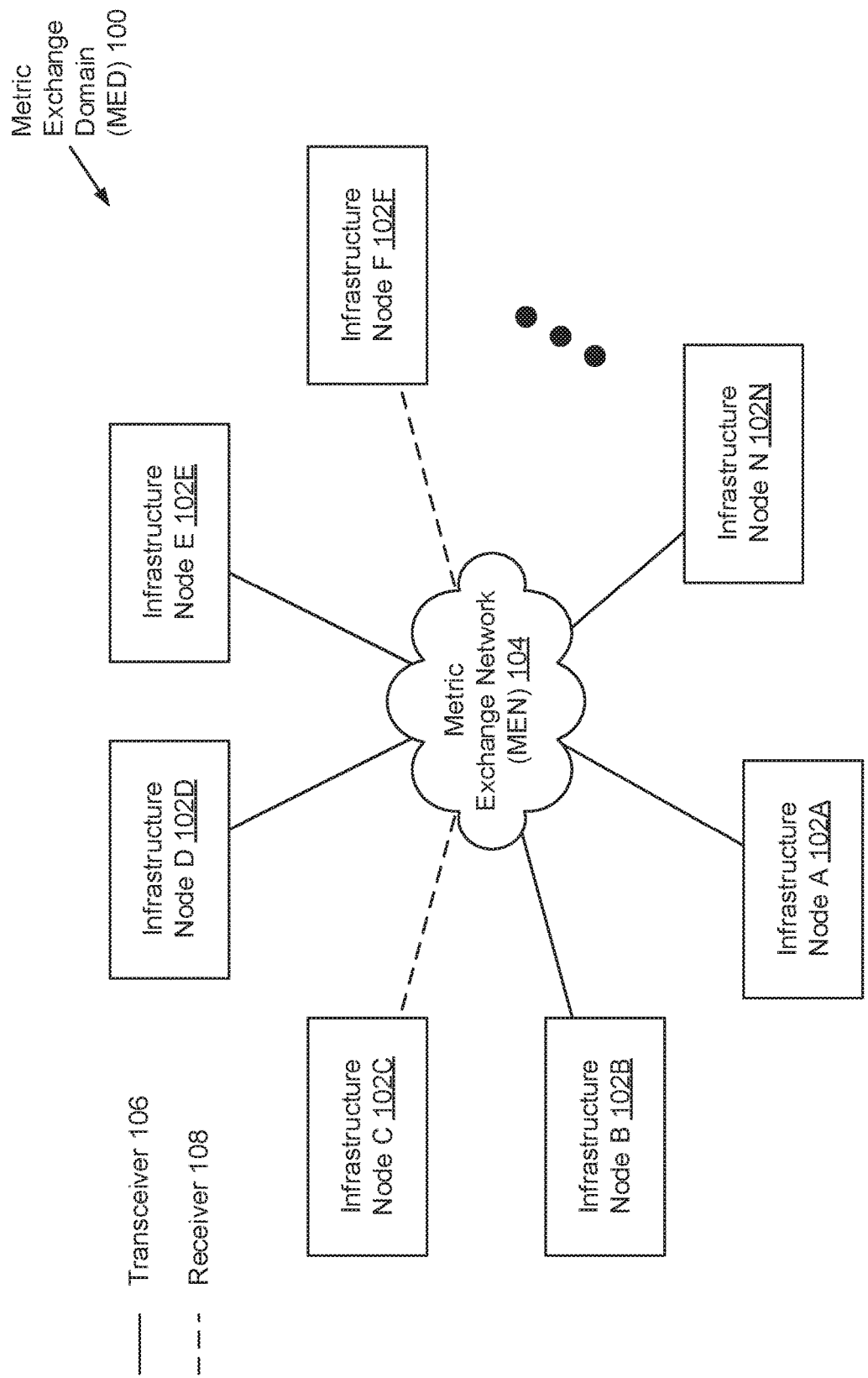
FIG. 1 shows a metric exchange domain in accordance with one or more embodiments of the invention.

FIG. 1 shows a metric exchange domain in accordance with one or more embodiments of the invention. The metric exchange domain (MED) (100) may represent an administrative grouping of multiple computer hosts (i.e., infrastructure nodes (102A-102N)) within a common infrastructure, which may be designed and configured for workload placement collaboration, and computing resource (e.g., processing, storage/memory, virtualization, networking, etc.) metric exchange. The common infrastructure, in turn, may refer to a configuration of various information technology (IT) components (e.g., servers, storage, networking, management, etc.) directed to hosting and maintaining various workloads. Furthermore, the MED (100) may include two or more infrastructure nodes (102A-102N) operatively connected to one another through a metric exchange network (MEN) (104). Each of these MED (100) components is described below.

In one embodiment of the invention, an infrastructure node (102A-102N) may represent a physical computing system configured for hosting one or more workloads, or for providing a computing environment whereon workloads may be implemented. Further, an infrastructure node (102A-102N) may exchange metrics and messages with other infrastructure nodes (102A-102N) registered in/to the MEN (104) in order to participate in collaborative workload placement. One of ordinary skill will appreciate that an infrastructure node (102A-102N) may perform other functionalities without departing from the scope of the invention. Examples of an infrastructure node (102A-102N) may include, but are not limited to, a server, a mainframe, a workstation computer, or any other computing system similar to the exemplary computing system shown in FIG. 7. Moreover, infrastructure nodes (102A-102N) are described in further detail below with respect to FIG. 2.

In one embodiment of the invention, a workload (not shown) may refer to a resource configured to perform certain work functions. Workloads may be instantiated, and may operate while consuming computing resources (e.g., processing, storage/memory, virtualization, networking, etc.) allocated thereto by the hosting infrastructure node (102A-102N). Examples of a workload may include, but are not limited to, a virtual machine, a container, a database, an application, and a collection of micro-services.

In one embodiment of the invention, the MEN (104) may represent a decentralized (or distributed) computing network configured for computing resource (e.g., processing, storage/memory, virtualization, networking, etc.) metrics and messages exchange amongst registered computing hosts (i.e., infrastructure nodes (102A-102N)). The MEN (104) may directly or indirectly connect the infrastructure nodes (102A-102N) to one another using a local area network (LAN), a wide area network (WAN) such as the Internet, a mobile network, any other network type, or any combination thereof. Further, the MEN (104) may be implemented using any combination of wired and/or wireless connections. In embodiments in which the MEN (104) indirectly connects at least a subset of the infrastructure nodes (102A-102N) to one another, the MEN (104) may include additional network-enabled devices or components (not shown) (e.g., switches, routers, gateways, etc.) configured to facilitate communications between the infrastructure nodes (102A-102N). Moreover, the MEN (104) may enable interaction between infrastructure nodes (102A-102N) through any combination of wired and/or wireless communication protocols.

In one embodiment of the invention, as a registrant and participant of the MEN (104), each infrastructure node (102A-102N) may either operate as a transceiver infrastructure node (106) or a receiver infrastructure node (108). A transceiver infrastructure node (106) may refer to an infrastructure node (102A-102N) configured for metric exchange, or the transmission and reception of computing resource metrics. On the other hand, a receiver infrastructure node (108) may refer to an infrastructure node (102A-102N) configured for metric storage, or just the reception of computing resource metrics. Furthermore, only transceiver infrastructure nodes (106) may host workloads thereon, whereas receiver infrastructure nodes (108) may serve, for example, as metric archivers and/or analyzers.

While FIG. 1 shows a configuration of components, other MED (100) configurations may be used without departing from the scope of the invention.

Figure 2:
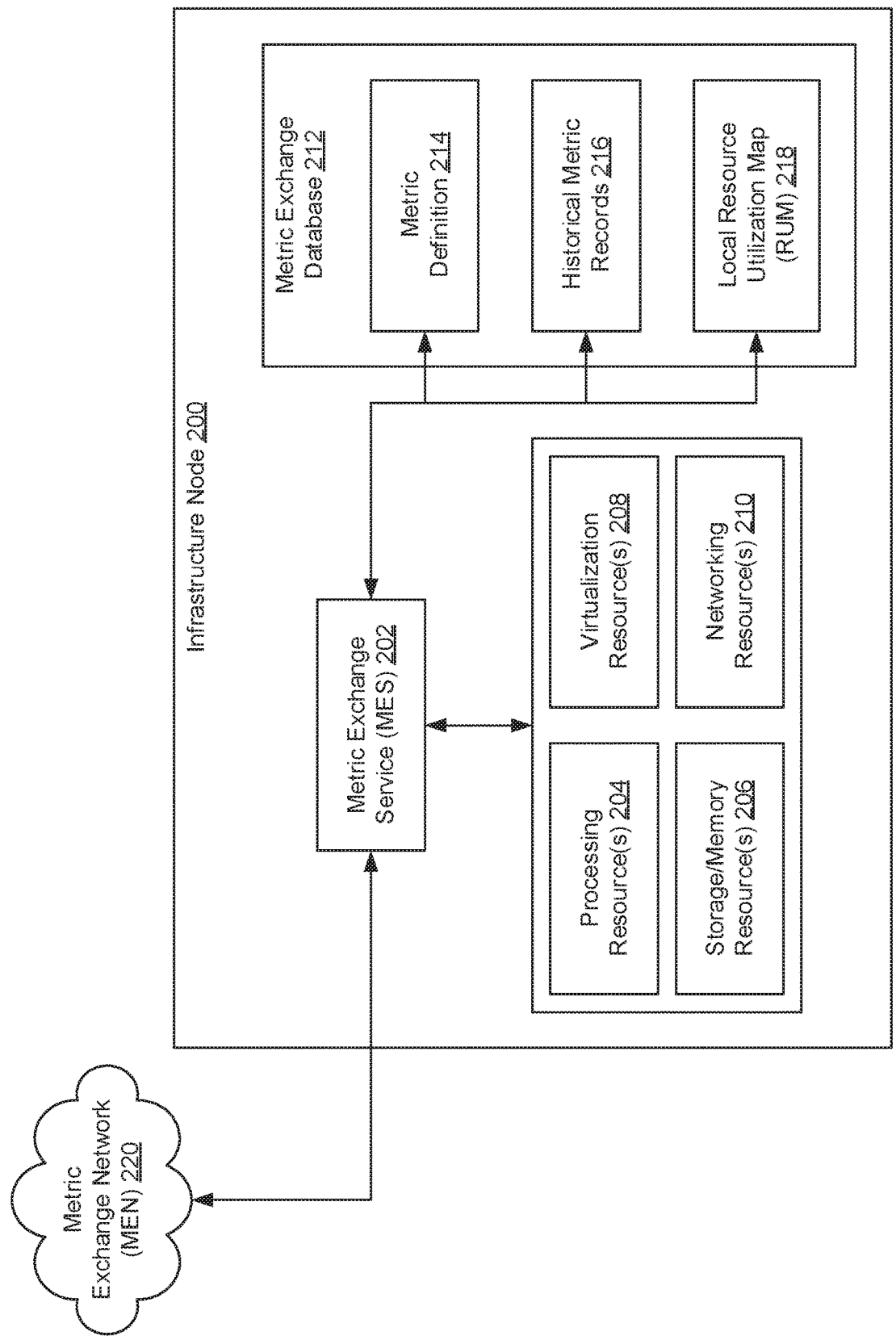
FIG. 2 shows an infrastructure node in accordance with one or more embodiments of the invention.

FIG. 2 shows an infrastructure node in accordance with one or more embodiments of the invention. The infrastructure node (200) may include a metric exchange service (MES) (202), various computing resources (e.g., processing resource(s) (204), storage/memory resource(s) (206), virtualization resource(s) (208), and networking resource(s) (210)), and a metric exchange database (212). Each of these infrastructure node (200) subcomponents is described below.

In one embodiment of the invention, the MES (202) may refer to a computer program that may execute on the underlying hardware of the infrastructure node (200). The MES (202) may be responsible for metric exchange network (MEN) (220) registration, local metrics capturing and distribution, remote metrics aggregation and storage, and workload placement collaboration. Concerning MEN (220) registration, the MES (202) (i.e., on a new infrastructure node (200) looking to join the MEN (220)) may submit an intent to participate by multicasting credentials (e.g., a password, a passphrase, etc.) and/or an authentication certificate to other existing registrants or participants (i.e., other infrastructure nodes (not shown)) of the MEN (220). During this registration process, the MES (202) may further specify a desired participant designation—i.e., whether the new infrastructure node (200) would operate as a transceiver or receiver infrastructure node (described above) (see e.g., FIG. 1). Furthermore, once registered with the various existing registrants or participants of the MEN (220), the MES (202) may receive a copy of one or more metric definitions (214) (described below) pertinent to local metrics collection and dissemination (if the new infrastructure node (200) were to operate as a transceiver infrastructure node). To the extent of the other aforementioned responsibilities, the MES (202) may include functionality to substantively perform the various steps outlined in the flowcharts of FIGS. 3-6C, which may be directed to methods for sharing local metrics, receiving remote metrics, transmitting workload allocation requests, and processing workload allocation requests in accordance with one or more embodiments of the invention. Moreover, one of ordinary skill will appreciate that the MES (202) may perform other functionalities without departing from the scope of the invention.

In one embodiment of the invention, a processing resource (204) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include, but are not limited to, a central processing unit (CPU), a graphical processing unit (GPU), and any other integrated circuit configured to execute computer readable program code or instructions. Further, examples of a processing resource (204), which may be provisioned, as needed to workloads (not shown) hosted on the infrastructure node (200), may include one or more processing cores, and one or more processing threads.

In one embodiment of the invention, a storage or memory resource (206) may refer to a measurable quantity of a storage/memory-relevant resource type, which can be requested, allocated, and consumed. A storage/memory-relevant resource type may encompass a physical device (i.e., hardware), a logical intelligence (i.e., software), or a combination thereof, which may provide temporary or permanent data storage functionality and/or services. Examples of a storage/memory-relevant resource type may include, but are not limited to, a hard disk drive (HDD), a solid state drive (SSD), random access memory (RAM), flash memory, and any other storage device or memory technology. Further, examples of a storage/memory resource (206), which may be provisioned, as needed to workloads (not shown) hosted on the infrastructure node (200), may include one or more bytes, and derivatives thereof (e.g., kilo-bytes, mega-bytes, giga-bytes, etc.).

In one embodiment of the invention, a virtualization resource (208) may refer to a measurable quantity of a virtualization-relevant resource type, which can be requested, allocated, and consumed. A virtualization-relevant resource type may encompass a physical device (i.e., hardware), a logical intelligence (i.e., software), or a combination thereof, which may provide computing abstraction functionality and/or services. Examples of a virtualization-relevant resource type may include, but are not limited to, a virtual machine, a container, a virtual CPU, a virtual storage pool, and any other virtualized resource. Further, examples of a virtualization resource (208), which may be provisioned, as needed to workloads (not shown) hosted on the infrastructure node (200), may include one or more virtual processing cores, one or more virtual processing threads, and one or more virtual bytes (and derivatives thereof).

In one embodiment of the invention, a networking resource (210) may refer to a measurable quantity of a networking-relevant resource type, which can be requested, allocated, and consumed. A networking-relevant resource type may encompass a physical device (i.e., hardware), a logical intelligence (i.e., intelligence), or a combination thereof, which may provide network connectivity functionality and/or services. Examples of a networking-relevant resource type may include, but are not limited to, a network interface card, a network adapter, a network processor, and any other network-enabling device or computer program. Further, examples of a networking resource (210), which may be provisioned, as needed to workloads (not shown) hosted on the infrastructure node (200), may include network bandwidth measured in bits or bytes per second.

In one embodiment of the invention, the metric exchange database (212) may refer to a data repository for storing various information pertinent to computing resource (204, 206, 208, 210) metric exchange and workload placement collaboration. The metric exchange database (212) may be implemented using one or more physical storage devices (not shown). Each physical storage device may encompass non-transitory computer readable media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the metric exchange database (212) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the various information stored in the metric exchange database (212) may include one or more metric definitions (214). A metric definition (214) may refer to a data file substantively directed to defining, and disclosing instructions to attaining, one or more computing resource (204, 206, 208, 210) metrics. Accordingly, a metric definition (214) may specify, but is not limited to, the following information: (a) a domain name uniquely identifying the metric exchange domain (MED) (see e.g., FIG. 1) in which the metric definition is valid; (b) a version character string reflecting a version number of the metric definition; (c) one or more collector commands reflecting computer instructions, which when executed, enable the executor (i.e., MES (202)) to capture one or more local computing resource (204, 206, 208, 210) metrics; and (d) metric metadata (e.g., metric name, metric category, etc.) describing the computing resource (204, 206, 208, 210) metric(s) specified in the collector command(s). Furthermore, the metric definition(s) (214), maintained on all MEN (220) participants, may always be uniform, and therefore, may specify collector command(s) and metric metadata directed to the same computing resource (204, 206, 208, 210) metrics.

In one embodiment of the invention, the various information stored in the metric exchange database (212) may include one or more historical metric records (216). A historical metric record (216) may refer to a data file or a data structure (e.g., table) that stores point-in-time values for computing resource (204, 206, 208, 210) metrics captured or received for a given point-in-time. Specifically, a historical metric record (216) may store point-in-time values for one or more local metrics, which may be captured through execution of the collector command(s) (described above) specified in the metric definition(s) (214) on the infrastructure node (200). Further, a historical metric record (216) may additionally or alternatively store point-in-time values for one or more remote metrics, which may be disseminated and received through the MEN (220) from one or more remote infrastructure nodes (not shown). The historical metric record(s) (216) may be maintained to archive various point-in-time metric values (i.e., local and/or remote), which may be used, for example, for offline data analysis directed to trending or forecasting.

In one embodiment of the invention, the various information stored in the metric exchange database (212) may include a local resource utilization map (RUM) (218). The local RUM (218) may refer to a data file substantively directed to consolidating the most current metric values for both local and remote metrics. Accordingly, the local RUM (218) may specify, but is not limited to, the following information: (a) a domain name uniquely identifying the MED (see e.g., FIG. 1) in which the local and remote metrics are valid; (b) a version character string reflecting a version number of the local RUM (218); (c) remote infrastructure node metadata (e.g., a node name or identifier, a network (e.g., Internet Protocol (IP)) address, etc.) describing one or more remote infrastructure nodes (not shown); and (d) most recently captured or received metric values for one or more local and remote metrics outlining the most recently known state of computing resource (204, 206, 208, 210) availability on the (local) infrastructure node (200) and any or all remote MEN (220) participants.

While FIG. 2 shows a configuration of subcomponents, other infrastructure node (200) configurations may be used without departing from the scope of the invention.

Figure 3:
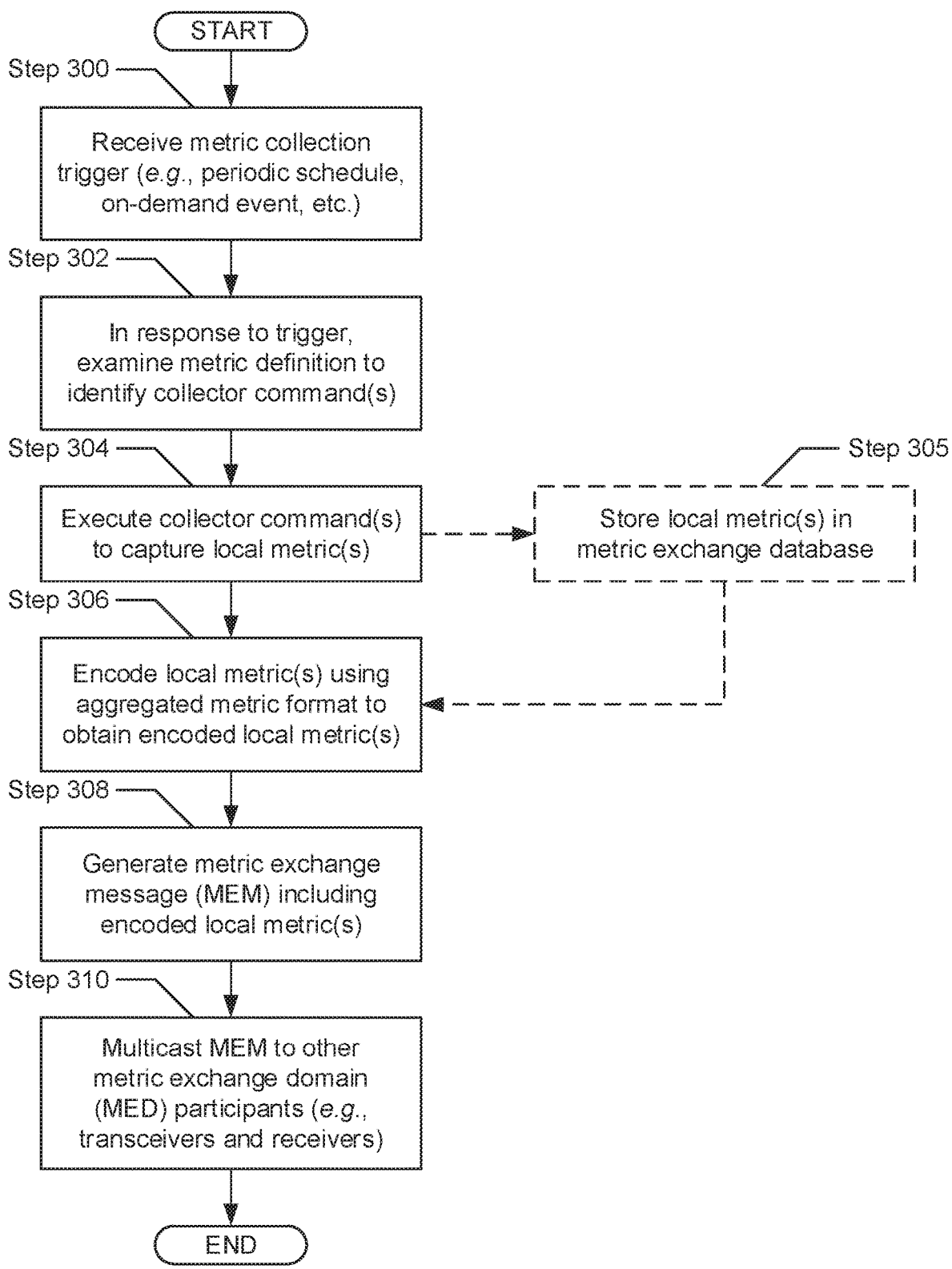
FIG. 3 shows a flowchart describing a method for sharing local metrics in accordance with one or more embodiments of the invention.

FIG. 3 shows a flowchart describing a method for sharing local metrics in accordance with one or more embodiments of the invention. The various steps outlined below may be performed by a transceiver infrastructure node (see e.g., FIGS. 1 and 2). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a metric collection trigger is received. In one embodiment of the invention, the metric collection trigger may pertain to the capture and distribution of local computing resource (e.g., processing, storage/memory, virtualization, networking, etc.) metrics. Further, the metric collection trigger may, for example, manifest as a scheduled task, which may transpire periodically, or an on-demand, administrator-initiated event. The metric collection trigger may or may not disclose a definition name, title, or other identifier that may uniquely identify a metric definition pertinent to local metric capture and distribution.

In Step 302, in response to the metric collection trigger (received in Step 300), a metric definition (described above) (see e.g., FIG. 2) is identified and examined. In one embodiment of the invention, examination of the metric definition may result in the identification of one or more collector commands (described above).

In Step 304, the collector command(s) (identified in Step 302) is/are executed. In one embodiment of the invention, execution of the collector command(s) may entail processing of the computer readable program code or computer instructions reflected thereby. Further, execution of the collector command(s) may result in the capture of one or more local metrics, where the local metric(s) may be defined in the metric definition (identified in Step 302). A local metric may refer to a measurement of quantitative assessment reflecting a current state of a given computing resource (e.g., processing, storage/memory, virtualization, networking, etc.) available on the local (or method-performing) infrastructure node. Each collector command may result in the capture of one or many local metrics.

In Step 305, the local metric(s) (captured in Step 304) may or may not be stored in the metric exchange database (see e.g., FIG. 2). Specifically, the local metric(s) may be consolidated as a historical metric record (described above). Storage of the local metric(s) as a historical metric record may be contingent on whether the metric exchange service (MES) (see e.g., FIG. 2) on the local (or method-performing) infrastructure node has been configured to perform this functionality.

In Step 306, the local metric(s) (captured in Step 304) is/are encoded. In one embodiment of the invention, metric (or more generally, data) encoding may refer to a process through which input data (i.e., the local metric(s)) may be converted into a specified data format. The specified data format may, for example, facilitate data transmission over a network, provide data security, aggregation, and/or compression, or impose other features. Furthermore, encoded local metric(s) may be obtained as a result of the encoding process.

In Step 308, a metric exchange message (MEM) is generated. In one embodiment of the invention, the MEM may represent a collection of one or more network traffic data units (e.g., frames, packets, datagrams, etc.), which may be configured to encapsulate and disseminate data to one or more destinations (e.g., metric exchange network (MEN) participants) through a network (e.g., MEN). The encapsulated data may include the encoded local metric(s) (obtained in Step 306).

In Step 310, the MEM (generated in Step 308) is multi-casted. In one embodiment of the invention, multicasting may refer to a single transmission of data, over a network (e.g., MEN), to a group of destinations (e.g., MEN participants) simultaneously. The addressees of the multi-casted MEM may include both transceiver and receiver infrastructure nodes (described above) (see e.g., FIG. 1).

Figure 4:
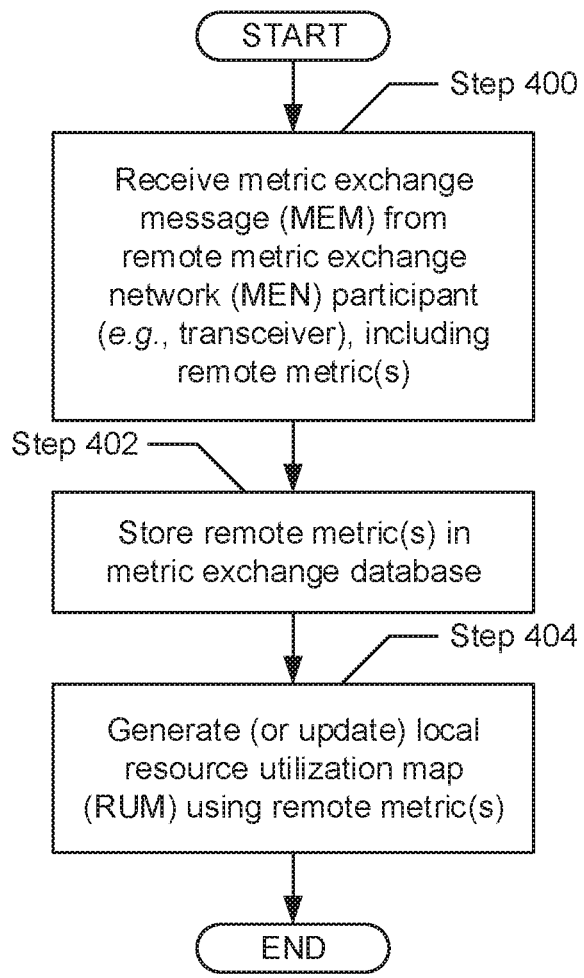
FIG. 4 shows a flowchart describing a method for receiving remote metrics in accordance with one or more embodiments of the invention.

FIG. 4 shows a flowchart describing a method for receiving remote metrics in accordance with one or more embodiments of the invention. The various steps outlined below may be performed by a transceiver or a receiver infrastructure node (see e.g., FIGS. 1 and 2). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a metric exchange message (MEM) is received. In one embodiment of the invention, the MEM may have been multi-casted from a remote metric exchange network (MEN) participant, such as a transceiver infrastructure node (described above) (see e.g., FIG. 1). Further, the MEM may represent a collection of one or more network traffic data units (e.g., frames, packets, datagrams, etc.), which may be configured to encapsulate and disseminate data to one or more destinations (e.g., MEN participants) through a network (e.g., MEN). Specifically, the data encapsulated in the received MEM may include one or more encoded remote metrics. An encoded remote metric may refer to a remote metric on which an encoding process has been applied, thereby converting the remote metric to a specified data format. The specified data format may, for example, facilitate data transmission over a network, provide data security, aggregation, and/or compression, or impose other features. Moreover, upon extracting the encoded remote metric(s), an encoding reversal (or decoding) process may be applied thereto, thereby resulting in the obtaining of the remote metric(s).

In Step 402, the remote metric(s) (obtained in Step 400) is/are stored in the metric exchange database (see e.g., FIG. 2) as a historical metric record (described above). In one embodiment of the invention, a remote metric may refer to a measurement of quantitative assessment reflecting a current state of a given computing resource (e.g., processing, storage/memory, virtualization, networking, etc.) available on a remote infrastructure node.

In Step 404, a local resource utilization map (RUM) is generated (or updated). In one embodiment of the invention, the local RUM may refer to a data file substantively directed to consolidating the most current metric values for both local and remote metrics. Details outlining the contents of a local RUM are described above with respect to FIG. 2. Furthermore, should a local RUM not exist on the local (or method-performing) infrastructure node, then a new local RUM may be generated and initialized using the remote metric(s) (obtained in Step 400). On the other hand, should a local RUM already exist on the local (or method-performing) infrastructure node, then a portion of the existing local RUM may be updated or replaced with the aforementioned remote metric(s).

Specifically, the existing local RUM portion, which may be updated or replaced, may have stored one or more previously received metric values reflecting a previous state of computing resource (e.g., processing, storage/memory, virtualization, networking, etc.) availability on the remote infrastructure node (from which the MEM had originated in Step 400).

Figure 5A:
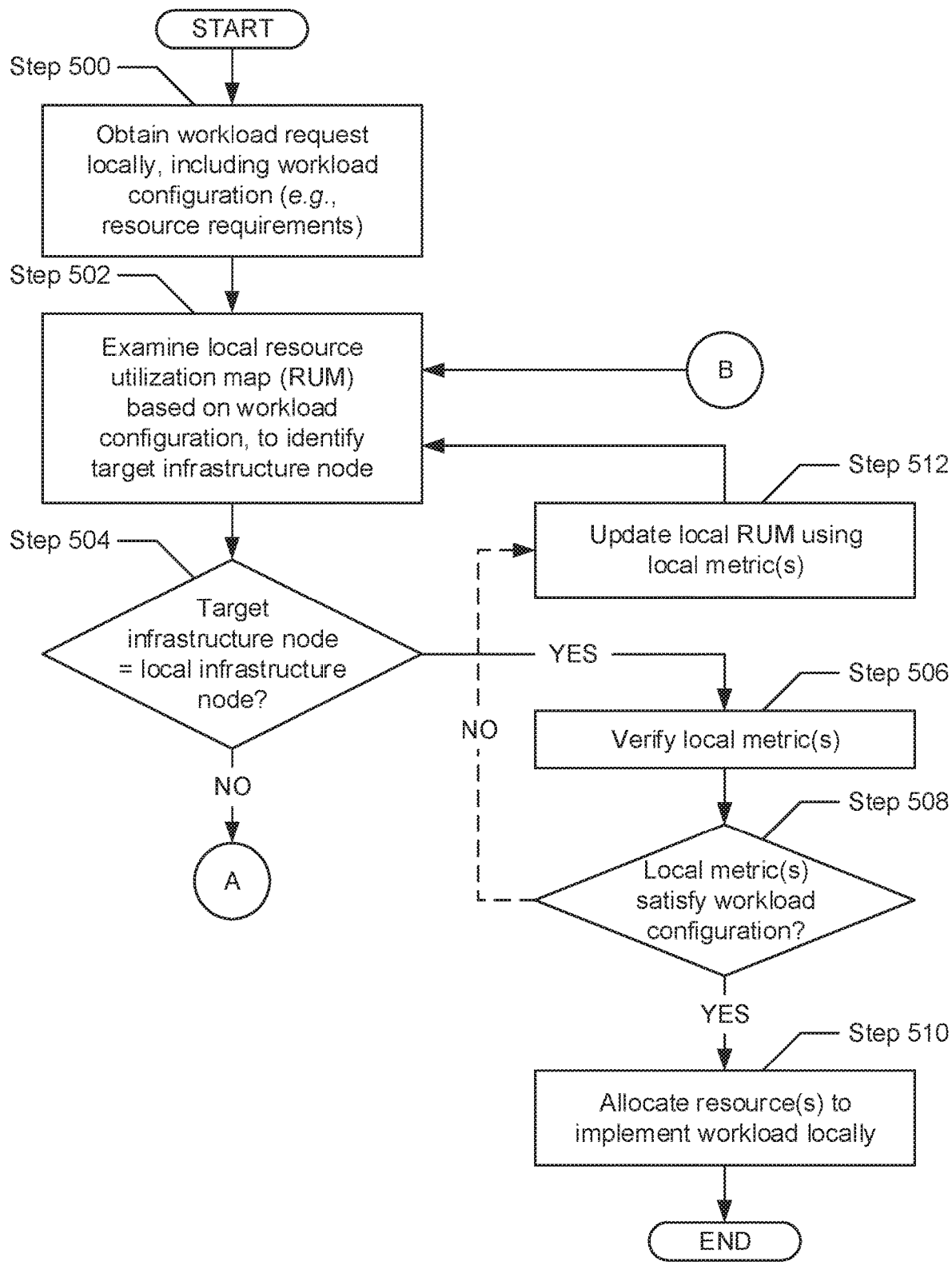
FIGS. 5A and 5B show flowcharts describing a method for transmitting workload allocation requests in accordance with one or more embodiments of the invention.
Figure 5B:
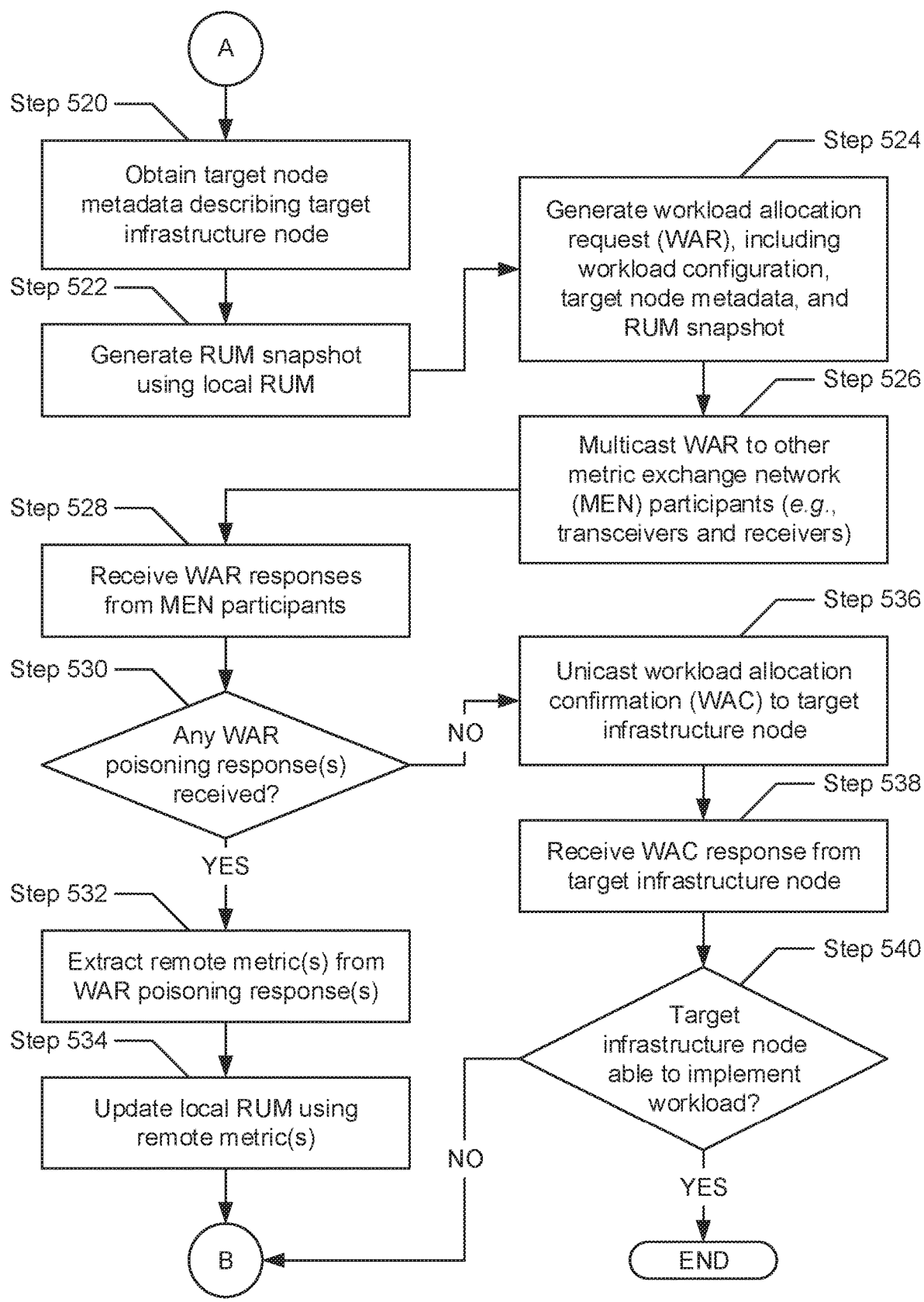

FIGS. 5A and 5B show flowcharts describing a method for transmitting workload allocation requests in accordance with one or more embodiments of the invention. The various steps outlined below may be performed by a transceiver infrastructure node (see e.g., FIGS. 1 and 2). Further, while the various steps in the flowchart are presented and described sequentially, one of ordinary skill will appreciate that some or all steps may be executed in different orders, may be combined or omitted, and some or all steps may be executed in parallel.

Turning to FIG. 5A, in Step 500, a workload request is obtained locally. In one embodiment of the invention, the workload request may pertain to the implementation of a workload (described above) (see e.g., FIG. 1), and may have been submitted by an administrator or user operating a remote administrator or user device operatively connected to the method-performing infrastructure node, or by an administrator or user serving as a tenant of the method-performing infrastructure node. Furthermore, the workload request may include a workload configuration for the workload sought to be implemented. The workload configuration may include a list of configuration parameters and respective configuration parameter values, which collectively define or specify workload metadata (e.g., workload name, workload data directory path, administrator or user name, etc.) describing the workload and minimum computing resource (e.g., processing, storage/memory, virtualization, networking, etc.) requirements for implementing the workload.

In Step 502, a local resource utilization map (RUM) is examined in view of the workload configuration (received via the workload request in Step 500). In one embodiment of the invention, the local RUM may refer to a data file substantively directed to consolidating the most current metric values for both local and remote metrics. Details outlining the contents of a local RUM are described above with respect to FIG. 2. Further, examination of the local RUM based on the workload configuration may result in the identification of one or more target infrastructure nodes. Each target infrastructure node may represent an infrastructure node (i.e., the local infrastructure node or a remote infrastructure node) that, based on the respective local or remote metric(s) recorded in the local RUM, has available computing resources that meet or exceed the minimum computing resource requirements specified in the workload configuration. Ideally, one target infrastructure node would be identified. In some cases, however, two or more target infrastructure nodes may be identified. In such cases, a preferential target infrastructure node may be selected from the two or more identified target infrastructure nodes based on additional criteria, such as the overall utilization trend of computing resources thereon over a period of time (which may be rendered through analyses of the historical metric record(s) maintained on the metric exchange database (see e.g., FIG. 2)).

In Step 504, a determination is made as to whether the target infrastructure node (identified in Step 502) is the local (or method-performing) infrastructure node. In one embodiment of the invention, if it is determined that the target infrastructure node is the local infrastructure node, then the process proceeds to Step 506. On the other hand, in another embodiment of the invention, if it is alternatively determined that the target infrastructure node is not the local infrastructure node, then the process alternatively proceeds to Step 520 (see e.g., FIG. 5B).

In Step 506, following the determination (in Step 504) that the target infrastructure node (identified in Step 502) is the local infrastructure node, one or more local metrics is/are verified. In one embodiment of the invention, verification of the local metric(s) may entail: identifying a metric definition (described above) (see e.g., FIG. 2) maintained in the metric exchange database; examining the metric definition to identify one or more collector commands specified therein; and executing the collector command(s) to capture current metric value(s) of one or more local metrics. A local metric may refer a measurement of quantitative assessment reflecting a current state of a given computing resource (e.g., processing, storage/memory, virtualization, networking, etc.) available on the local (or method-performing) infrastructure node.

In Step 508, a determination is made as to whether the local metric(s) (verified in Step 506) satisfies/satisfy the minimum computing resource requirements specified in the workload configuration (obtained via the workload request in Step 500). A local metric may satisfy a relevant minimum computing resource requirement when the local metric (or value thereof) matches or exceeds the relevant minimum computing resource requirement (or value thereof). Conversely, should a local metric (or value thereof) fall short of the relevant minimum computing resource requirement (or value thereof), then the local metric may not satisfy the relevant minimum computing resource requirement.

Furthermore, any or all of the local metric(s) must satisfy all of the minimum computing resource requirements, specified in the workload configuration, in order to proceed with implementation of the workload. Accordingly, in one embodiment of the invention, if it is determined that the local metric(s) satisfy the workload configuration, then the process proceeds to Step 510. On the other hand, in another embodiment of the invention, if it is alternatively determined that the local metric(s) do not satisfy the workload configuration, then the process alternatively proceeds to Step 512.

In Step 510, following the determination (in Step 508) that the local metric(s) (verified in Step 506) satisfy the workload configuration (obtained via the workload request in Step 500), one or more computing resources is/are allocated. In one embodiment of the invention, the allocated computing resource(s) may include measurable quantities (or units) of a processing-relevant resource type, a storage/memory-relevant resource type, a virtualization-relevant resource type, and/or a networking-relevant resource type (described above) (see e.g., FIG. 2), which may be available on the local infrastructure node. Furthermore, the allocated computing resource(s) may collectively support the instantiation and operation of the workload on the local infrastructure node.

In Step 512, following the alternative determination (in Step 508) that the local metric(s) (verified in Step 506) fail to satisfy the workload configuration (obtained via the workload request in Step 500), the local RUM (examined in Step 502) is updated. That is, in one embodiment of the invention, a portion of the local RUM may be updated or replaced with the aforementioned local metric(s). Specifically, the local RUM portion, which may be updated or replaced, may have stored one or more previously captured metric values reflecting a previous state of computing resource (e.g., processing, storage/memory, virtualization, networking, etc.) availability on the local (or method-performing) infrastructure node. Thereafter, the process proceeds to Step 502, where the local RUM (updated in Step 512) is re-examined to identify one or more new target infrastructure nodes.

Turning to FIG. 5B, in Step 520, following the alternative determination (in Step 504) that the target infrastructure node (identified in Step 502) is not the local infrastructure node (but rather a remote infrastructure node), metadata pertaining to the target (remote) infrastructure node is obtained. In one embodiment of the invention, the obtained target infrastructure node metadata may be retrieved from the metric exchange database, and may include, but is not limited to, a node name uniquely assigned to the target infrastructure node, and a network address (e.g., an Internet Protocol (IP) address) uniquely assigned to the target infrastructure node.

In Step 522, a RUM snapshot is generated from or using the local RUM (examined in Step 502). In one embodiment of the invention, the RUM snapshot may refer to a copy of the local RUM and, thereby, may represent a copy of the state of the computing resource(s) available on each of the metric exchange network (MEN) participants (or more specifically, the transceiver infrastructure nodes) (including the target infrastructure node) as recorded or maintained by the local infrastructure node.

In Step 524, a workload allocation request (WAR) is generated. In one embodiment of the invention, the WAR may represent a collection of one or more network traffic data units (e.g., frames, packets, datagrams, etc.), which may be configured to encapsulate and disseminate data to one or more destinations (e.g., metric exchange network (MEN) participants) through a network (e.g., MEN). Further, the encapsulated data may include the workload configuration (received via the workload request in Step 500), the target infrastructure node metadata (obtained in Step 520), and the RUM snapshot (generated in Step 522).

In Step 526, the WAR (generated in Step 524) is multi-casted. In one embodiment of the invention, multicasting may refer to a single transmission of data, over a network (e.g., MEN), to a group of destinations (e.g., MEN participants) simultaneously. The addressees of the multi-casted WAR may include both transceiver and receiver infrastructure nodes (described above) (see e.g., FIG. 1).

In Step 528, one or more WAR responses is/are received. In one embodiment of the invention, each received WAR response may be obtained from a MEN participant whom may have replied to the WAR (multi-casted in Step 526). Further, each received WAR response may represent a collection of one or more network traffic data units (e.g., frames, packets, datagrams, etc.), which may be configured to encapsulate and disseminate data to one or more destinations (i.e., MEN participants) through a network (e.g., MEN). Furthermore, the encapsulated data in each WAR response may vary depending on whether the WAR response represents a poison or a non-poison WAR response. A poison WAR response, from a given remote infrastructure node, may reflect that a RUM maintained on the given remote infrastructure node is inconsistent with (or mismatches) the RUM snapshot (generated in Step 522). Subsequently, a poison WAR response may include one or more remote metrics highlighting discrepancies between the given remote infrastructure node RUM and the RUM snapshot. Conversely, a non-poison WAR response, from a given remote infrastructure node, may reflect that a RUM maintained on the given remote infrastructure node is consistent with (or matches) the RUM snapshot (generated in Step 522). Accordingly, a non-poison WAR response may encapsulate nothing more than an indication or affirmation of this consistency.

In Step 530, a determination is made as to whether any (i.e., at least one) poison WAR response (described above) is received (in Step 528). Accordingly, in one embodiment of the invention, if it is determined that at least one poison WAR response had been received, then the process proceeds to Step 532. On the other hand, in another embodiment of the invention, if it is alternatively determined that zero poison WAR responses have been received, then the process alternatively proceeds to Step 536.

In Step 532, following the determination (in Step 530) that at least one of the WAR responses (received in Step 528) is a poison WAR response (described above), one or more remote metrics, encapsulated in the poison WAR response(s), is/are extracted therefrom. In one embodiment of the invention, the encapsulated remote metric(s), as described above, may represent discrepancies between the RUM(s) maintained on the remote infrastructure node(s) (whom had replied with a poison WAR response) and the RUM snapshot (generated in Step 522).

In Step 534, the local RUM (examined in Step 502) is updated using the remote metric(s) (from each poison WAR response received in Step 528). That is, in one embodiment of the invention, one or more portions of the local RUM may be updated or replaced with the aforementioned remote metric(s). Specifically, a different local RUM portion may be updated or replaced by the metric discrepancies received from each poison WAR response. Each different local RUM portion may have stored one or more previously received metric values reflecting a previous state of computing resource (e.g., processing, storage/memory, virtualization, networking, etc.) availability on a given remote infrastructure node (associated with a given poison WAR response). Thereafter, the process proceeds to Step 502 (see e.g., FIG. 5A), where the local RUM (updated in Step 534) is re-examined to identify one or more new target infrastructure nodes.

In Step 536, following the alternative determination (in Step 530) that none of the WAR responses (received in Step 528) is a poison WAR response (described above), a workload allocation confirmation (WAC) is generated and uni-casted. In one embodiment of the invention, the WAC may represent a collection of one or more network traffic data units (e.g., frames, packets, datagrams, etc.), which may be configured to encapsulate and disseminate data to a destination (i.e., the target infrastructure node) through a network (e.g., MEN). The encapsulated data may include an affirmation to implement the workload (for which the workload request had been received in Step 500). Further, unicasting may refer to a single transmission of data, over a network (e.g., MEN), to a particular destination (e.g., a particular MEN participant).

In Step 538, a WAC response is subsequently received from the target (remote) infrastructure node. In one embodiment of the invention, the WAC response may represent a collection of one or more network traffic data units (e.g., frames, packets, datagrams, etc.), which may be configured to encapsulate and disseminate data to a destination (i.e., the local infrastructure node) through a network (e.g., MEN). The encapsulated data may include an indication that the target (remote) infrastructure node can or cannot implement the workload based on a recently performed verification of the available computing resource(s) on the target (remote) infrastructure node.

In Step 540, a determination is made, based on the WAC response (received in Step 538), as to whether the target infrastructure node (to which the WAC had been unicasted in Step 536) is able to implement the workload sought to be implemented. In one embodiment of the invention, if it is determined that the target infrastructure node can implement the workload, then the process ends. On the other hand, in another embodiment of the invention, if it is alternatively determined that the target infrastructure node cannot implement the workload, then the process alternatively proceeds to Step 502 (see e.g., FIG. 5B), where the local RUM (examined in the previous visit to Step 502) is re-examined to identify one or more new target infrastructure nodes.

Figure 6A:
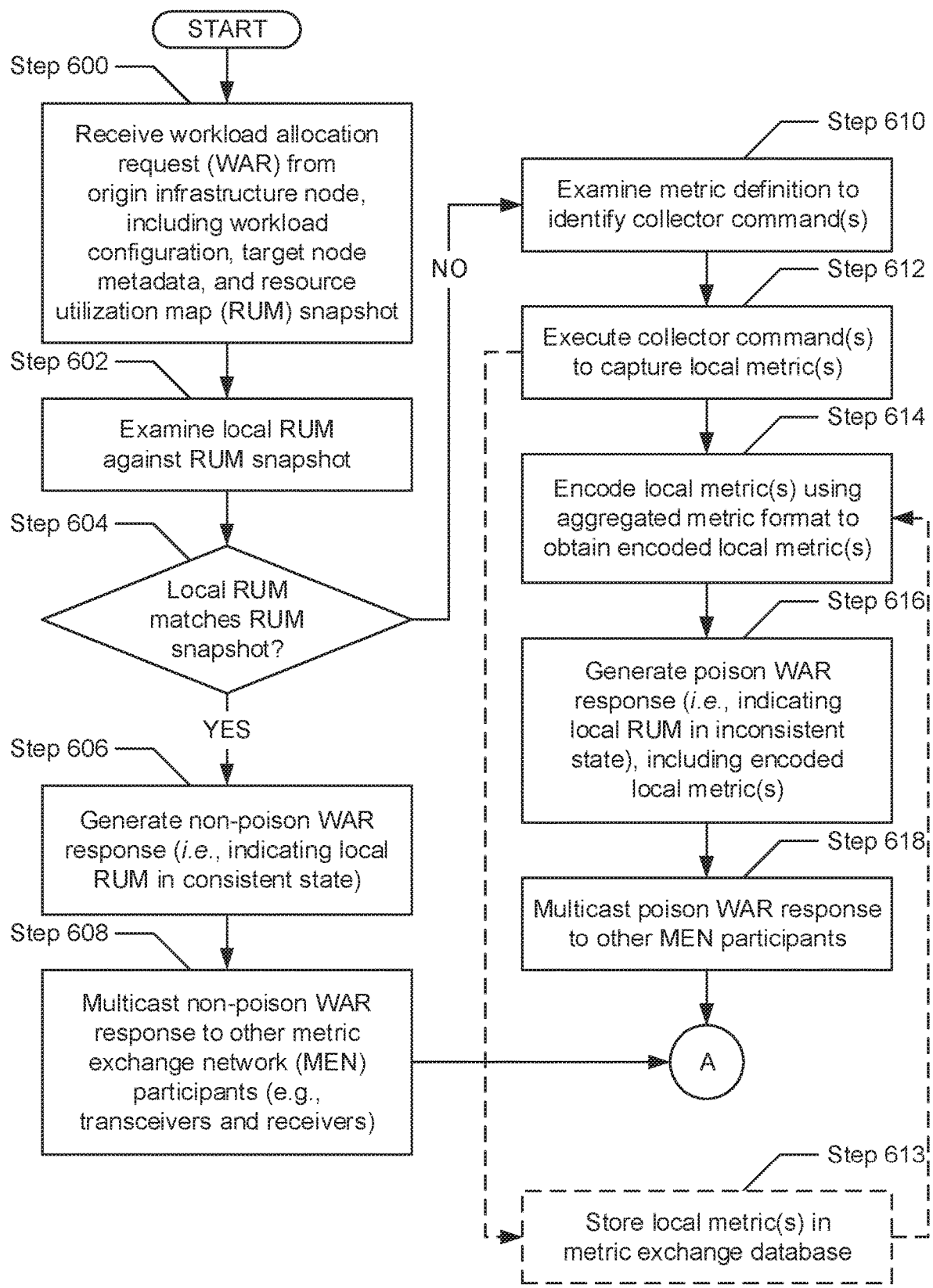
FIGS. 6A-6C show flowcharts describing a method for processing workload allocation requests in accordance with one or more embodiments of the invention.
Figure 6B:
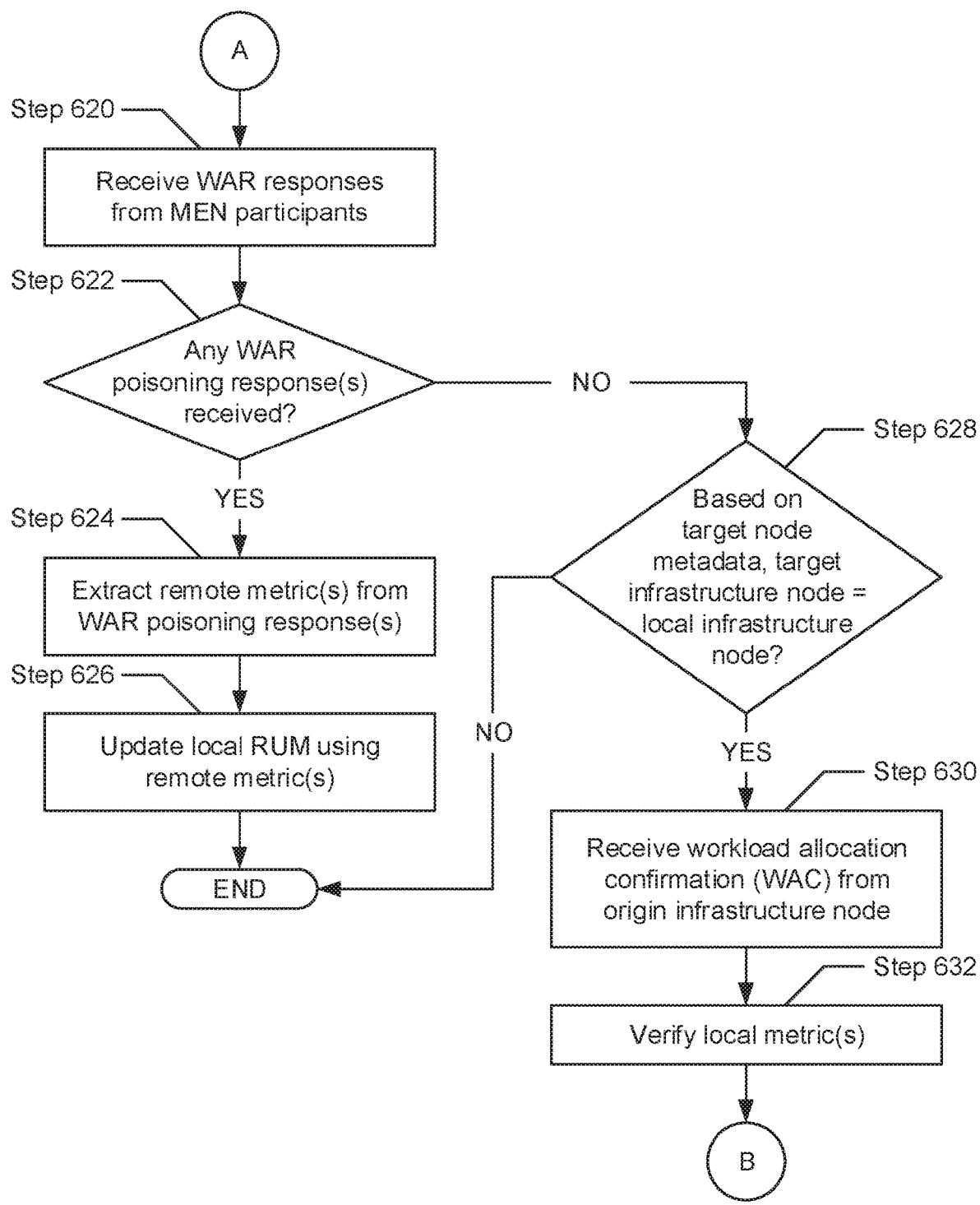
Figure 6C:
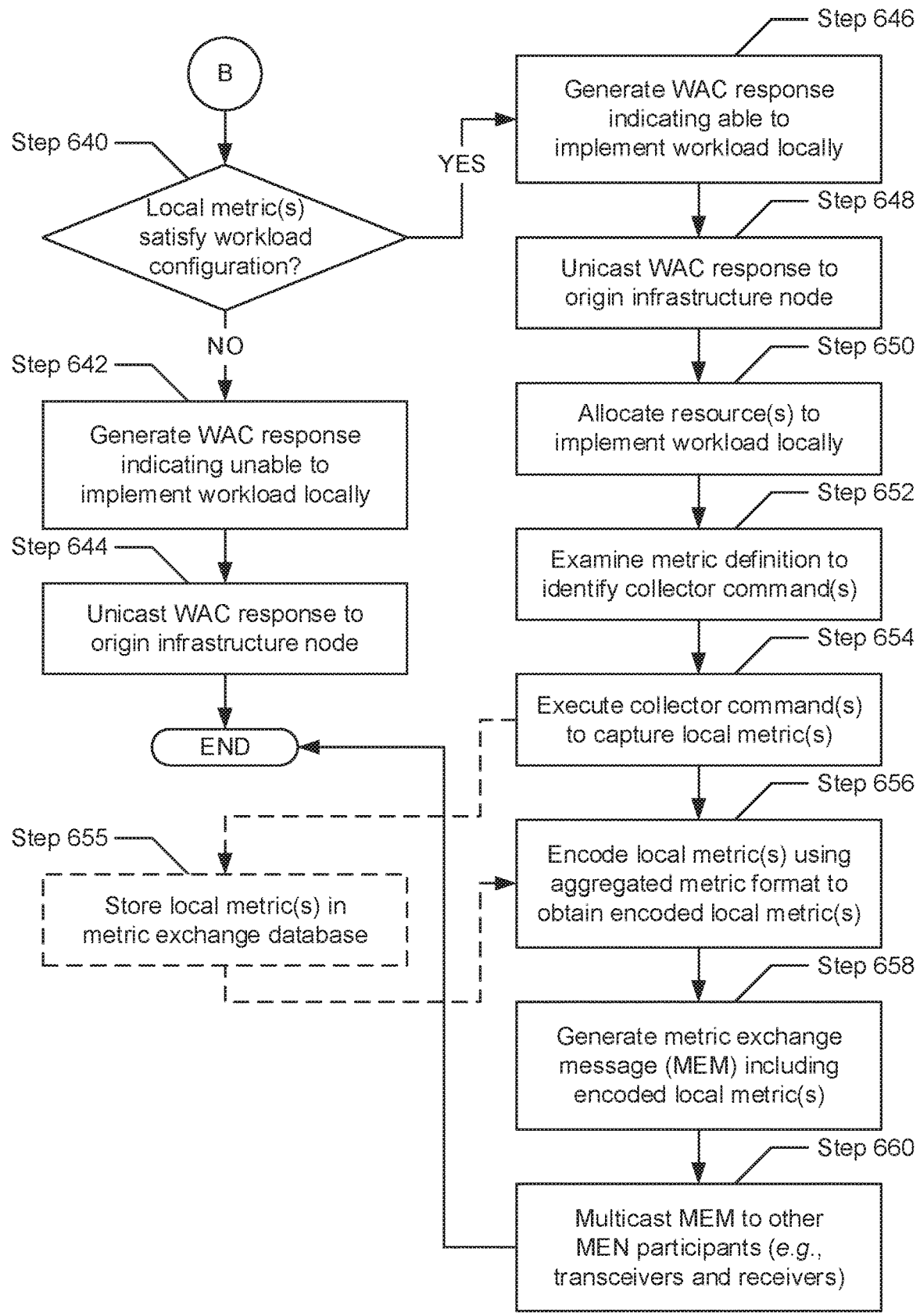

FIGS. 6A-6C show flowcharts describing a method for processing workload allocation requests in accordance with one or more embodiments of the invention. The various steps outlined below may be performed by a transceiver infrastructure node (see e.g., FIGS. 1 and 2). Further, while the various steps in the flowchart are presented and described sequentially, one of ordinary skill will appreciate that some or all steps may be executed in different orders, may be combined or omitted, and some or all steps may be executed in parallel.

Turning to FIG. 6A, in Step 600, a workload allocation request (WAR) is received. In one embodiment of the invention, the WAR may have been multi-casted from an origin infrastructure node. The origin infrastructure node may refer to a remote metric exchange network (MEN) participant, such as a transceiver infrastructure node (described above) (see e.g., FIG. 1), which had generated the WAR for distribution. Further, the WAR may represent a collection of one or more network traffic data units (e.g., frames, packets, datagrams, etc.), which may be configured to encapsulate and disseminate data to one or more destinations (e.g., MEN participants) through a network (e.g., MEN). Specifically, the data encapsulated in the received WAR may include a workload configuration for a workload (described above) (see e.g., FIG. 1) sought to be implemented, target infrastructure node metadata describing a target infrastructure node, and a resource utilization map (RUM) snapshot.

In one embodiment of the invention, the workload configuration may include a list of configuration parameters and respective configuration parameter values, which collectively define or specify workload metadata (e.g., workload name, workload data directory path, administrator or user name, etc.) describing the workload and minimum computing resource (e.g., processing, storage/memory, virtualization, networking, etc.) requirements for implementing the workload. Furthermore, the target infrastructure node metadata may include, but is not limited to, a node name uniquely assigned to the target infrastructure node, and a network address (e.g., an Internet Protocol (IP) address) uniquely assigned to the target infrastructure node, where the target infrastructure node had been identified, by the origin infrastructure node, as the MEN participant most appropriate to host/implement the workload. Moreover, the RUM snapshot may refer to a copy of the local RUM on the origin infrastructure node and, thereby, may represent a copy of the state of the computing resource(s) available on each of the MEN participants (or more specifically, the transceiver infrastructure nodes) (including the target infrastructure node) as recorded or maintained by the origin infrastructure node.

In Step 602, a local RUM (on the local or method-performing infrastructure node) is examined against the RUM snapshot (received via the WAR in Step 600). Specifically, in one embodiment of the invention, comparisons may be performed between the various metric values recorded in the local RUM and the various metric values recorded in the RUM snapshot. The objective of the examination may be to identify any discrepancies (or inconsistencies) between the sets of metric values. Accordingly, should the local RUM match the RUM snapshot, the local RUM may be reflective of a consistent state, whereas should the local RUM mismatch the RUM snapshot, the local RUM may alternatively be reflective of an inconsistent state.

In Step 604, a determination is made, based on the examination (performed in Step 602), as to whether the local RUM matches the RUM snapshot. In one embodiment of the invention, if it is determined that the local RUM and RUM snapshot match, then the process proceeds to Step 606. On the other hand, in another embodiment of the invention, if it is alternatively determined that the local RUM and the RUM snapshot mismatch, then the process alternatively proceeds to Step 610.

In Step 606, following the determination (in Step 604) that the local RUM (examined in Step 602) matches the RUM snapshot (received via the WAR in Step 600), a non-poison WAR response is generated. In one embodiment of the invention, the non-poison WAR response may represent a collection of one or more network traffic data units (e.g., frames, packets, datagrams, etc.), which may be configured to encapsulate and disseminate data to one or more destinations (i.e., MEN participants) through a network (e.g., MEN). More specifically, the non-poison WAR response may represent one of two forms of a WAR response, which may reflect the consistency between the local RUM maintained on the local (or method-performing) infrastructure node and the RUM snapshot (or RUM maintained on the origin infrastructure node).

In Step 608, the non-poison WAR response (generated in Step 608) is multi-casted. In one embodiment of the invention, multicasting may refer to a single transmission of data, over a network (e.g., MEN), to a group of destinations (e.g., MEN participants) simultaneously. The addressees of the multi-casted non-poison WAR response may include both transceiver and receiver infrastructure nodes (described above) (see e.g., FIG. 1). Thereafter, the process proceeds to Step 620 (see e.g., FIG. 6B).

In Step 610, following the alternative determination (in Step 604) that the local RUM (examined in Step 602) mismatches the RUM snapshot (received via the WAR in Step 600), a metric definition (described above) (see e.g., FIG. 2) is identified and examined. In one embodiment of the invention, examination of the metric definition may result in the identification of one or more collector commands (described above).

In Step 612, the collector command(s) (identified in Step 610) is/are executed. In one embodiment of the invention, execution of the collector command(s) may entail processing of the computer readable program code or computer instructions reflected thereby. Further, execution of the collector command(s) may result in the capture of one or more local metrics, where the local metric(s) may be defined in the metric definition (identified in Step 610). A local metric may refer to a measurement of quantitative assessment reflecting a current state of a given computing resource (e.g., processing, storage/memory, virtualization, networking, etc.) available on the local (or method-performing) infrastructure node. Each collector command may result in the capture of one or many local metrics.

In Step 613, the local metric(s) (captured in Step 612) may or may not be stored in the metric exchange database (see e.g., FIG. 2). Specifically, the local metric(s) may be consolidated as a historical metric record (described above). Storage of the local metric(s) as a historical metric record may be contingent on whether the metric exchange service (MES) (see e.g., FIG. 2) on the local (or method-performing) infrastructure node has been configured to perform this functionality.

In Step 614, the local metric(s) (captured in Step 612) is/are encoded. In one embodiment of the invention, metric (or more generally, data) encoding may refer to a process through which input data (i.e., the local metric(s)) may be converted into a specified data format. The specified data format may, for example, facilitate data transmission over a network, provide data security, aggregation, and/or compression, or impose other features. Furthermore, encoded local metric(s) may be obtained as a result of the encoding process.

In Step 616, a poison WAR response is generated. In one embodiment of the invention, the poison WAR response may represent a collection of one or more network traffic data units (e.g., frames, packets, datagrams, etc.), which may be configured to encapsulate and disseminate data to one or more destinations (i.e., MEN participants) through a network (e.g., MEN). More specifically, the poison WAR response may represent one of two forms of a WAR response, which may reflect the inconsistency between the local RUM maintained on the local (or method-performing) infrastructure node and the RUM snapshot (or RUM maintained on the origin infrastructure node). Further, the poison WAR response may encapsulate any discrepancies (or inconsistencies) identified between the two aforementioned RUMs.

In Step 618, the poison WAR response (generated in Step 616) is multi-casted. In one embodiment of the invention, multicasting may refer to a single transmission of data, over a network (e.g., MEN), to a group of destinations (e.g., MEN participants) simultaneously. The addressees of the multi-casted poison WAR response may include both transceiver and receiver infrastructure nodes (described above) (see e.g., FIG. 1). From here, the process proceeds to Step 620 (see e.g., FIG. 6B).

Turning to FIG. 6B, in Step 620, one or more WAR responses is/are received. In one embodiment of the invention, each received WAR response may be obtained from another MEN participant (excluding the origin infrastructure node) whom may have replied to the WAR (multi-casted by the origin infrastructure node). Further, each received WAR response may represent a collection of one or more network traffic data units (e.g., frames, packets, datagrams, etc.), which may be configured to encapsulate and disseminate data to one or more destinations (i.e., MEN participants) through a network (e.g., MEN). Furthermore, the encapsulated data in each WAR response may vary depending on whether the WAR response represents a poison or a non-poison WAR response (described above).

In Step 622, a determination is made as to whether any (i.e., at least one) poison WAR response (described above) is received (in Step 620). Accordingly, in one embodiment of the invention, if it is determined that at least one poison WAR response had been received, then the process proceeds to Step 624. On the other hand, in another embodiment of the invention, if it is alternatively determined that zero poison WAR responses have been received, then the process alternatively proceeds to Step 628.

In Step 624, following the determination (in Step 622) that at least one of the WAR responses (received in Step 620) is a poison WAR response (described above), one or more remote metrics, encapsulated in the poison WAR response(s), is/are extracted therefrom. In one embodiment of the invention, the encapsulated remote metric(s), as described above, may represent discrepancies between the RUM(s) maintained on the remote infrastructure node(s) (whom had multi-casted a given poison WAR response) and the RUM snapshot (multi-casted via the WAR from the origin infrastructure node).

In Step 626, the local RUM (examined in Step 602) is updated using the remote metric(s) (from each poison WAR response received in Step 620). That is, in one embodiment of the invention, one or more portions of the local RUM may be updated or replaced with the aforementioned remote metric(s). Specifically, a different local RUM portion may be updated or replaced by the metric discrepancies received from each poison WAR response. Each different local RUM portion may have stored one or more previously received metric values reflecting a previous state of computing resource (e.g., processing, storage/memory, virtualization, networking, etc.) availability on a given remote infrastructure node (associated with a given poison WAR response).

In Step 628, following the alternative determination (in Step 622) that none of the WAR responses (received in Step 620) is a poison WAR response (described above), a determination is made as to whether the target infrastructure node, for which target infrastructure node metadata had been received (in Step 600), is the local infrastructure node. In one embodiment of the invention, if it is determined that the target infrastructure node is the local infrastructure node, then the process proceeds to Step 630. On the other hand, in another embodiment of the invention, if it is alternatively determined that the target infrastructure node is not the local infrastructure node, then the process ends.

In Step 630, following the determination (in Step 628) that the target infrastructure node (associated with the target infrastructure node metadata (received in Step 600)) is the local infrastructure node, a workload allocation confirmation (WAC) is received from the origin infrastructure node. In one embodiment of the invention, the WAC may represent a collection of one or more network traffic data units (e.g., frames, packets, datagrams, etc.), which may be configured to encapsulate and disseminate data to a destination (i.e., the target infrastructure node) through a network (e.g., MEN). The encapsulated data may include an affirmation to implement the workload (respective to the workload configuration that had been received in Step 600). Further, unicasting may refer to a single transmission of data, over a network (e.g., MEN), to a particular destination (e.g., a particular MEN participant).

In Step 632, one or more local metrics is/are verified. In one embodiment of the invention, verification of the local metric(s) may entail: identifying a metric definition (described above) (see e.g., FIG. 2) maintained in the metric exchange database; examining the metric definition to identify one or more collector commands specified therein; and executing the collector command(s) to capture current metric value(s) of one or more local metrics. A local metric may refer a measurement of quantitative assessment reflecting a current state of a given computing resource (e.g., processing, storage/memory, virtualization, networking, etc.) available on the local (or method-performing) infrastructure node. Hereinafter, the process proceeds to Step 640 (see e.g., FIG. 6C).

Turning to FIG. 6C, in Step 640, a determination is made as to whether the local metric(s) (verified in Step 632) satisfies/satisfy the minimum computing resource requirements specified in the workload configuration (obtained via the WAR in Step 600). A local metric may satisfy a relevant minimum computing resource requirement when the local metric (or value thereof) matches or exceeds the relevant minimum computing resource requirement (or value thereof). Conversely, should a local metric (or value thereof) fall short of the relevant minimum computing resource requirement (or value thereof), then the local metric may not satisfy the relevant minimum computing resource requirement. Furthermore, any or all of the local metric(s) must satisfy all of the minimum computing resource requirements, specified in the workload configuration, in order to proceed with implementation of the workload. Accordingly, in one embodiment of the invention, if it is determined that the local metric(s) satisfy the workload configuration, then the process proceeds to Step 646. On the other hand, in another embodiment of the invention, if it is alternatively determined that the local metric(s) do not satisfy the workload configuration, then the process alternatively proceeds to Step 642.

In Step 642, following the determination (in Step 640) that the local metric(s) (verified in Step 632) fail to satisfy the workload configuration (received via the WAR in Step 600), a WAC response is generated. In one embodiment of the invention, the WAC response may represent a collection of one or more network traffic data units (e.g., frames, packets, datagrams, etc.), which may be configured to encapsulate and disseminate data to a destination (i.e., the local infrastructure node) through a network (e.g., MEN). The encapsulated data may include an indication that the target infrastructure node (i.e., the local infrastructure node) cannot or is unable to implement the workload based on the local metric(s) failing to satisfy the minimum computing resource requirements specified in the workload configuration.

In Step 644, the WAC response (generated in Step 642) is unicasted (described above) to the origin infrastructure node. In Step 646, following the alternative determination (in Step 640) that the local metric(s) (verified in Step 632) satisfy the workload configuration (received via the WAR in Step 600), a different WAC response is generated. In one embodiment of the invention, this WAC response may alternatively indicate that the target infrastructure node (i.e., the local infrastructure node) can or is able to implement the workload based on the local metric(s) satisfying the minimum computing resource requirements specified in the workload configuration.

In Step 648, the WAC response (generated in Step 646) is unicasted to the origin infrastructure node. Thereafter, in Step 650, one or more computing resources is/are allocated. In one embodiment of the invention, the allocated computing resource(s) may include measurable quantities (or units) of a processing-relevant resource type, a storage/memory-relevant resource type, a virtualization-relevant resource type, and/or a networking-relevant resource type (described above) (see e.g., FIG. 2), which may be available on the local infrastructure node. Furthermore, the allocated computing resource(s) may collectively support the instantiation and operation of the workload on the local infrastructure node.

In Step 652, following the successful implementation of the workload (in Step 650), a metric definition (described above) (see e.g., FIG. 2) is identified and examined. In one embodiment of the invention, examination of the metric definition may result in the identification of one or more collector commands (described above).

In Step 654, the collector command(s) (identified in Step 652) is/are executed. In one embodiment of the invention, execution of the collector command(s) may entail processing of the computer readable program code or computer instructions reflected thereby. Further, execution of the collector command(s) may result in the capture of one or more local metrics, where the local metric(s) may be defined in the metric definition (examined in Step 652). A local metric may refer to a measurement of quantitative assessment reflecting a current state of a given computing resource (e.g., processing, storage/memory, virtualization, networking, etc.) available on the local (or method-performing) infrastructure node. Each collector command may result in the capture of one or many local metrics.

In Step 655, the local metric(s) (captured in Step 654) may or may not be stored in the metric exchange database (see e.g., FIG. 2). Specifically, the local metric(s) may be consolidated as a historical metric record (described above). Storage of the local metric(s) as a historical metric record may be contingent on whether the metric exchange service (MES) (see e.g., FIG. 2) on the local (or method-performing) infrastructure node has been configured to perform this functionality.

In Step 656, the local metric(s) (captured in Step 654) is/are encoded. In one embodiment of the invention, metric (or more generally, data) encoding may refer to a process through which input data (i.e., the local metric(s)) may be converted into a specified data format. The specified data format may, for example, facilitate data transmission over a network, provide data security, aggregation, and/or compression, or impose other features. Furthermore, encoded local metric(s) may be obtained as a result of the encoding process.

In Step 658, a metric exchange message (MEM) is generated. In one embodiment of the invention, the MEM may represent a collection of one or more network traffic data units (e.g., frames, packets, datagrams, etc.), which may be configured to encapsulate and disseminate data to one or more destinations (e.g., metric exchange network (MEN) participants) through a network (e.g., MEN). The encapsulated data may include the encoded local metric(s) (obtained in Step 656).

In Step 660, the MEM (generated in Step 658) is multicasted. In one embodiment of the invention, multicasting may refer to a single transmission of data, over a network (e.g., MEN), to a group of destinations (e.g., MEN participants) simultaneously. The addressees of the multi-casted MEM may include both transceiver and receiver infrastructure nodes (described above) (see e.g., FIG. 1).

Figure 7:
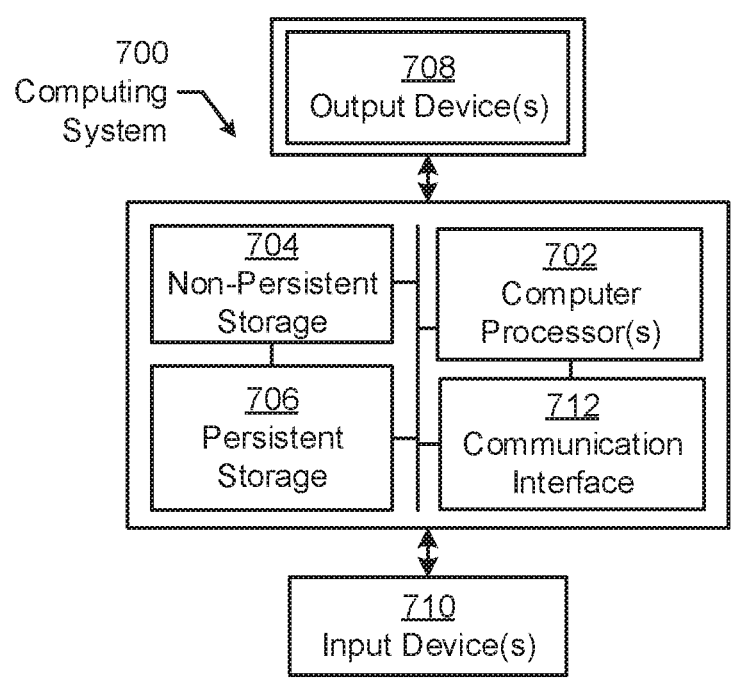
FIG. 7 shows an exemplary computing system in accordance with one or more embodiments of the invention.

FIG. 7 shows an exemplary computing system in accordance with one or more embodiments of the invention. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a central processing unit (CPU) and/or a graphics processing unit (GPU). The computing system (700) may also include one or more input devices (710), such as a touchscreen, keyboard, mouse, microphone, touchpad, electronic pen, or any other type of input device. Further, the communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

In one embodiment of the invention, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for collaborative workload placement, comprising:
    obtaining, by an origin infrastructure node (IN), a first workload request comprising a first workload configuration for a first workload, wherein the first workload configuration specifies at least an identifier of the first workload and minimum computing resource requirements for implementing the first workload, wherein the minimum computing resource requirements specify at least a virtualization resource and a networking resource;
    identifying, by the origin IN and by examining a local resource utilization map (RUM) based on the first workload configuration, a plurality of participants that comprises a first target IN, wherein the first target IN is not the origin IN;
    multicasting, by the origin IN, a workload allocation request for the first workload to the plurality of participants operatively connected through a metric exchange network, wherein the workload allocation request specifies the first workload configuration sought to be implemented, wherein the workload allocation request comprises a RUM snapshot of the local RUM maintained on the origin IN;
    unicasting, by the origin IN, a workload allocation confirmation for the first workload to the first target IN, upon receiving the workload allocation confirmation from the plurality of participants;
    receiving, from the first target IN, a workload allocation confirmation response verifying that the first target IN comprises available computing resources satisfying the minimum computing resource requirements specified in the first workload configuration;
    deploying, by the origin IN and based on the workload allocation confirmation response from the first target IN, the first workload to the first target IN, wherein the confirmation response indicates that the first target IN is able to implement the first workload; and
    executing the first workload by the first target IN.

2. The method of claim 1, wherein identifying the first target IN, comprises:
    comparing the minimum computing resource requirements against the local RUM comprising a plurality of metric sets corresponding to the plurality of participants; and
    identifying the first target IN from the plurality of participants based on a metric set, corresponding to the first target IN, at least meeting the minimum computing resource requirements.

3. The method of claim 1, wherein the workload allocation request further comprises target IN metadata describing the first target IN.

4. The method of claim 3, wherein the target IN metadata comprises an IN name and a network address associated with the first target IN.

5. The method of claim 3, wherein each of the responses to the workload allocation request from the plurality of participants reflects that a remote RUM, maintained on a respective participant, is consistent with the RUM snapshot.

6. The method of claim 1, wherein the minimum computing resource requirements further specify a processing resource and a storage resource.

7. The method of claim 1, further comprising:
    receiving, from the first target IN, a multi-casted metric exchange message comprising a new remote metric set reflecting computing resource availability on the first target IN following an implementation of the first workload thereon; and
    updating the local RUM by using the new remote metric set to replace an existing remote metric set that reflected computing resource availability on the first target IN prior to the implementation of the first workload thereon.

8. The method of claim 1, further comprising:
    obtaining, by the origin IN, a second workload request comprising a second workload configuration for a second workload;
    identifying, based on the second workload configuration, a second target IN, wherein the second target IN is the origin IN;
    making a determination that a local metric set satisfies the minimum computing resource requirements specified in the second workload configuration;
    allocating, based on the determination, local computing resources at least equivalent to the minimum computing resource requirements; and
    implementing the second workload locally using the local computing resources.

9. The method of claim 1, further comprising:
    obtaining, by the origin IN, a second workload request comprising a second workload configuration for a second workload;
    identifying, based on the second workload configuration, a second target IN, wherein the second target IN is the origin IN;

making a determination that a local metric set fails to satisfy minimum computing resource requirements specified in the second workload configuration;

based on the determination:

updating the local RUM using the local metric set; and identifying, based on the second workload configuration, a third target IN, wherein the third target IN is not the origin IN.

10. A non-transitory computer readable medium (CRM) comprising computer readable program code, which when executed by a computer processor, enables the computer processor to:

obtain, by an origin infrastructure node (IN), a first workload request comprising a first workload configuration for a first workload, wherein the first workload configuration specifies at least an identifier of the first workload and minimum computing resource requirements for implementing the first workload, wherein the minimum computing resource requirements specify at least a virtualization resource and a networking resource;

identify, by the origin IN and by examining a local resource utilization map (RUM) based on the first workload configuration, a plurality of participants that comprises a first target IN, wherein the first target IN is not the origin IN;

multicast, by the origin IN, a workload allocation request for the first workload to the plurality of participants operatively connected through a metric exchange network, wherein the workload allocation request specifies the first workload configuration sought to be implemented, wherein the workload allocation request comprises a RUM snapshot of the local RUM maintained on the origin IN;

unicast, by the origin IN, a workload allocation confirmation for the first workload to the first target IN, upon receiving the workload allocation confirmation from the plurality of participants;

receive, from the first target IN, a workload allocation confirmation response verifying that the first target IN comprises available computing resources satisfying the minimum computing resource requirements specified in the first workload configuration;

deploy, by the origin IN and based on the workload allocation confirmation response from the first target IN, the first workload to the first target IN, wherein the confirmation response indicates that the first target IN is able to implement the first workload; and execute the first workload by the first target IN.

11. The non-transitory CRM of claim 10, comprising computer readable program code, which when executed by the computer processor, further enables the computer processor to identify the first target IN, by:

comparing the minimum computing resource requirements against the local RUM comprising a plurality of metric sets corresponding to the plurality of participants; and identifying the first target IN from the plurality of participants based on a metric set, corresponding to the first target IN, at least meeting the minimum computing resource requirements.

12. The non-transitory CRM of claim 10, wherein the workload allocation request further comprises target IN metadata describing the first target IN.

13. The non-transitory CRM of claim 12, wherein the target IN metadata comprises an IN name and a network address associated with the first target IN.

14. The non-transitory CRM of claim 12, wherein each of the responses to the workload allocation request from the plurality of participants reflects that a remote RUM, maintained on a respective participant, is consistent with the RUM snapshot.

15. The non-transitory CRM of claim 10, wherein the minimum computing resource requirements specify a processing resource and a storage resource.

16. The non-transitory CRM of claim 10, comprising computer readable program code, which when executed by the computer processor, further enables the computer processor to:

receive, from the first target IN, a multi-casted metric exchange message comprising a new remote metric set reflecting computing resource availability on the first target IN following an implementation of the first workload thereon; and update the local RUM by using the new remote metric set to replace an existing remote metric set that reflected computing resource availability on the first target IN prior to the implementation of the first workload thereon.

17. The non-transitory CRM of claim 10, comprising computer readable program code, which when executed by the computer processor, further enables the computer processor to:

obtain, by the origin IN, a second workload request comprising a second workload configuration for a second workload;

identify, based on the second workload configuration, a second target IN, wherein the second target IN is the origin IN;

make a determination that a local metric set satisfies the minimum computing resource requirements specified in the second workload configuration;

allocate, based on the determination, local computing resources at least equivalent to the minimum computing resource requirements; and implement the second workload locally using the local computing resources.

18. The non-transitory CRM of claim 10, comprising computer readable program code, which when executed by the computer processor, further enables the computer processor to:

obtain, by the origin IN, a second workload request comprising a second workload configuration for a second workload;

identify, based on the second workload configuration, a second target IN, wherein the second target IN is the origin IN;

make a determination that a local metric set fails to satisfy minimum computing resource requirements specified in the second workload configuration;

based on the determination:

update the local RUM using the local metric set; and identify, based on the second workload configuration, a third target IN, wherein the third target IN is not the origin IN.

* * * * *